US012675118B2

(12) United States Patent
Jia et al.

(10) Patent No.: US 12,675,118 B2
(45) Date of Patent: Jul. 7, 2026

(54) UNMANNED AERIAL VEHICLE CONTROL METHOD AND APPARATUS, AND UNMANNED AERIAL VEHICLE

(71) Applicant: SZ DJI TECHNOLOGY CO., LTD., Shenzhen (CN)

(72) Inventors: Xianghua Jia, Shenzhen (CN); Kai Wang, Shenzhen (CN); Lu Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 218 days.

(21) Appl. No.: 18/534,743

(22) Filed: Dec. 11, 2023

(65) Prior Publication Data

US 2024/0126305 A1     Apr. 18, 2024

Related U.S. Application Data

(63) Continuation of application No. PCT/CN2021/103634, filed on Jun. 30, 2021.

(51) Int. Cl.
*G05D 1/667*     (2024.01)
*A01C 23/04*     (2006.01)
(Continued)

(52) U.S. Cl.
CPC ............. *G05D 1/667* (2024.01); *B64U 50/13* (2023.01); *G05D 1/48* (2024.01); *A01C 23/047* (2013.01);
(Continued)

(58) Field of Classification Search
CPC ...... G05D 1/667; G05D 1/48; G05D 2105/15; G05D 2109/25; B64U 50/13; B64U 2101/45; A01C 23/047; A01G 25/09
See application file for complete search history.

(56) References Cited

U.S. PATENT DOCUMENTS

2019/0011355 A1     1/2019   Ni et al.

FOREIGN PATENT DOCUMENTS

CN     104642286 A     5/2015
CN     104977935 A     10/2015
(Continued)

OTHER PUBLICATIONS

International Search Report and Written Opinion mailed on Nov. 26, 2021, received for PCT Application PCT/CN2021/103634, filed on Jun. 30, 2021, 11 pages including English Translation.

*Primary Examiner* — Michael D Lang
(74) *Attorney, Agent, or Firm* — ANOVA LAW GROUP, PLLC

(57) ABSTRACT

The present application relates to a control method of an aerial vehicle. The aerial vehicle may comprise a propulsion structure for providing flight power and a spraying apparatus for spraying a material. The control method may comprise determining current target information of the aerial vehicle during a process of the aerial vehicle performing a spraying task, wherein the current target information indicates wind field strength of a downward pressure wind field generated by the propulsion structure; determining, based on the current target information, a desired relative flight altitude of the aerial vehicle corresponding to the current target information relative to the material being sprayed below the aerial vehicle; and controlling the aerial vehicle to fly toward the desired relative flight altitude.

19 Claims, 3 Drawing Sheets

(51) Int. Cl.

| | | |
|---|---|---|
| *A01G 25/09* | (2006.01) | |
| *B64U 50/13* | (2023.01) | |
| *B64U 101/45* | (2023.01) | |
| *G05D 1/48* | (2024.01) | |
| *G05D 105/15* | (2024.01) | |
| *G05D 109/25* | (2024.01) | |

(52) U.S. Cl.
CPC .......... *A01G 25/09* (2013.01); *B64U 2101/45* (2023.01); *G05D 2105/15* (2024.01); *G05D 2109/25* (2024.01)

(56) References Cited

FOREIGN PATENT DOCUMENTS

| | | | |
|---|---|---|---|
| CN | 105292480 | A | 2/2016 |
| CN | 108519775 | A | 9/2018 |
| CN | 108990945 | A | 12/2018 |
| CN | 208523610 | U | 2/2019 |
| CN | 110203391 | A | 9/2019 |
| WO | 2020137554 | A1 | 7/2020 |

UNMANNED AERIAL VEHICLE CONTROL METHOD AND APPARATUS, AND UNMANNED AERIAL VEHICLE

CROSS-REFERENCE TO RELATED APPLICATION

The present application is a continuation of international Application No. PCT/CN2021/103634, filed Jun. 30, 2021, the entire contents of which being incorporated herein by reference in its entirety.

TECHNICAL FIELD

The present application relates to a field of control technology and, in particular, to a control method, an apparatus and an unmanned aerial vehicle (UAV).

BACKGROUND

Currently, a UAV can be equipped with a spraying apparatus that can spray crops with materials such as medicine, water, or fertilizer. During flight, power components (e.g., propellers) that power the UAV may generate a downward pressure wind field, which blows the material sprayed by the spraying apparatus downward. As a weight of the UAV varies when the UAV is performing the spraying task, the strength of the downward pressure wind field generated by the propellers also varies, which makes the effect of the downward pressurize wind field on the collapsing of the crops to vary. At certain stages of the flight, the downward pressure wind field may cause greater damage to the crops by collapsing the crops, and at certain stages of the flight, the downward pressure wind field may cause the material to poorly penetrate the crops, thereby result in a poor spraying effect.

SUMMARY

Some embodiments of the present application provide a method of controlling a UAV and an apparatus, which are capable of reducing the collapsing damage to the crop being sprayed while ensuring the spraying effect.

An embodiment of the present application provides a control method of an aerial vehicle. The aerial vehicle may comprise a propulsion structure for providing flight power and a spraying apparatus for spraying a material. The control method may comprise determining current target information of the aerial vehicle during a process of the aerial vehicle performing a spraying task, wherein the current target information indicates wind field strength of a downward pressure wind field generated by the propulsion structure; determining, based on the current target information, a desired relative flight altitude of the aerial vehicle corresponding to the current target information relative to the material being sprayed below the aerial vehicle; and controlling the aerial vehicle to fly toward the desired relative flight altitude. The aerial vehicle may be a UAV. The material may be a crop. The propulsion structure may be a propeller.

An embodiment of the present application provides a method of controlling an unmanned aircraft, the unmanned aircraft comprising a propeller for providing flight power and a spraying apparatus for spraying material. The control method may comprise:

determining current target information of the UAV during a process of the UAV performing a spraying task, wherein the current target information indicates wind field strength of a downward pressure wind field generated by the propeller;

determining, based on the current target information, a desired relative flight altitude of the UAV corresponding to the current target information relative to a crop being sprayed below the UAV; and controlling the UAV to fly toward the desired relative flight altitude.

Another embodiment of the present application provides a control apparatus for a UAV, the UAV comprising a propeller for providing flight power and a spraying apparatus for spraying material, the control apparatus comprising:

a first determining module for determining current target information for the UAV during a process of the UAV performing a spraying task, wherein the current target information indicates wind field strength of the downward pressure wind field currently generated by the propeller;

a second determining module for determining, based on the current target information, a desired relative flight altitude of the UAV corresponding to the current target information relative to the crop being sprayed below the UAV; and a control module for controlling the UAV fly toward the desired relative flight altitude.

Another embodiment of the present application provides a control apparatus for a UAV, the UAV comprising a propeller for providing flight power and a spraying apparatus for spraying material, the control apparatus comprising: a memory and a processor, wherein.

the memory stores a program code;

the processor is configured to invoke and execute the program code and perform following steps when the program code is executed:

determining current target information of the UAV during a process of the UAV performing a spraying task, wherein the current target information indicates wind field strength of a downward pressure wind field generated by the propeller;

determining, based on the current target information, a desired relative flight altitude of the UAV corresponding to the current target information relative to a crop being sprayed below the UAV; and controlling the UAV to fly toward the desired relative flight altitude.

Another embodiment of the present application is a control method of an unmanned aerial vehicle (UAV), the UAV comprising a propeller for providing flight power, the control method comprising:

determining current target information of the UAV during a process of the UAV performing a task on a material below the UAV, wherein the current target information indicates wind field strength of a downward pressure wind field generated by the propeller;

determining, based on the current target information, a desired relative flight altitude of the UAV corresponding to the current target information relative to the material below the UAV; and controlling the UAV to fly toward the desired relative flight altitude.

Another embodiment of the present application provides a UAV comprising a propeller for providing flight power, a spraying apparatus for spraying material, and a control apparatus as mentioned above.

In the technical solution provided by some embodiments of the present application, in the process of the UAV performing a spraying task, current target information for indicating the wind field strength of a downward pressurize wind field generated by a propeller of the UAV is determined; and based on the current target information, the desired relative flight altitude of the UAV relative to the crop being sprayed is adjusted. Adopting the technical solution provided by some embodiments of the present application, it is possible to ensure the spraying effect of the material while ensuring reducing the damage of the collapsing the crop to be sprayed by the downward pressure wind field generated by the propeller.

It should be understood that the above general description and the detailed description that follows are exemplary and explanatory only and do not limit the present application.

BRIEF DESCRIPTION OF THE DRAWINGS

In order to explain the technical features of embodiments of the present disclosure more clearly, the drawings used in the present disclosure are briefly introduced as follow. Obviously, the drawings in the following description are some exemplary embodiments of the present disclosure. Ordinary person skilled in the art may obtain other drawings and features based on these disclosed drawings without inventive efforts.

DETAILED DESCRIPTION

Figure 1:
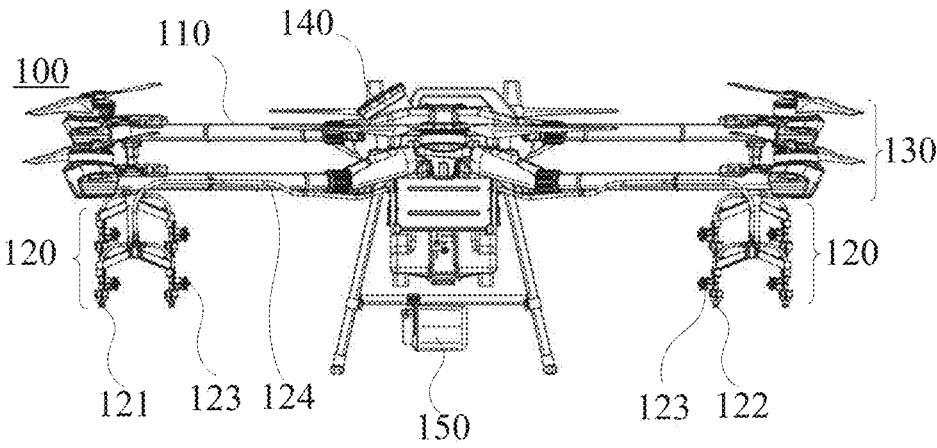
FIG. 1 shows a schematic diagram of a structure of a UAV provided by an embodiment of the present application.

In order to make the purpose, technical solutions and advantages of embodiments of the present application clearer, the technical solutions in the embodiments of the present application will be described in the following in conjunction with the accompanying drawings in the embodiments of the present application. It is obvious that the described embodiments are a part of the embodiments of the present application and not all of the embodiments. Based on the embodiments in this application, all other embodiments obtained by a person of ordinary skill in the art without making creative effort fall within the scope of protection of this application.

Unless otherwise defined, all technical and scientific terms used herein have the same meaning as commonly understood by those skilled in the art belonging to this application. The terms used herein in the specification of this application are used only for the purpose of describing specific embodiments and are not intended to limit this application.

In a process of a spraying task carried out by a UAV used for spraying operation, as the spraying apparatus sprays a material (e.g., medicinal liquid, fertilizers, etc.), a load weight of the UAV changes, which can lead to an unstable downward pressure wind field generated by rotation of propellers of the UAV to cause soft-stemmed crops to fall down or collapse or a problem of insufficient spraying penetration. For example, in an early stage of the spraying task of the UAV, due to the spraying apparatus carrying more materials, the load weight of the UAV is larger. At this time, the rotational speed of the propeller of the UAV is higher, and the downward pressure wind field generated by the propeller has a larger wind field strength, which may cause a larger damage to the crops due to collapsing the crops. In a later stage of the spraying task of the UAV, as the material is sprayed, the load weight of the UAV is reduced, the rotational speed of the propeller of the UAV is reduced, and the wind field strength will be reduced, which may cause a problem of soft-stemmed crops falling down or insufficient spraying penetration. The rotational speed is reduced and the wind field strength will be reduced at the later stage of the spraying task if the flight altitude of the UAV is maintained as the same as the early stage of the spraying task. The smaller wind field strength may lead to poor material penetration in the crop, and the spraying effect is poor.

In order to solve the above problem or other problems, some embodiments of the present application provide a technical solution that, by real-time predicting the wind field strength of the current downward pressure wind field based on the weight-carrying information of the UAV or the motor rotational speed information, and adjusting a relative flight height of the UAV relative to the crop to be sprayed based on the predicted results, can ensure that in the process of the UAV executing the spraying task, it can not only reduce the damage to the crops due to collapsing the crops, but also guarantee the spraying effect of the material being sprayed.

Some embodiments of the present application are described in detail below in conjunction with the accompanying drawings. The following embodiments and features in the embodiments may be combined with each other in case of no conflict between the embodiments.

Referring to FIG. 1, FIG. 1 is a schematic diagram of a structure of an aerial vehicle such as a UAV implementing the control method provided by some embodiments of the present application. As shown in FIG. 1, the UAV 100 comprises a body 110, a spraying apparatus 120 disposed on the body 110, and a power system 130 disposed on the body 110, wherein the spraying apparatus 120 is used for spraying materials such as medicinal liquid, water, or fertilizers on agricultural products, forest trees, and the like in the farming industry, and the power system 130 is used to provide flight power for the UAV 100 to drive the spraying apparatus 120 in motion. The power system 130 is used to provide flight power for the UAV 100 to drive the spraying apparatus 120 to different positions or different angles to carry out spraying operations in a predetermined area. The power system 130 may comprise a propulsion structure such as a propeller.

In an embodiment, the UAV 100 also includes a material tank 140, the material tank 140 is used to provide materials such as medicinal liquid, water, fertilizer, etc. For example, when the materials are liquid materials such as medicinal liquid or water, the spraying apparatus 120 includes a first nozzle assembly 121, a second nozzle assembly 122, a pressure adjusting valve 123, and a liquid guide tube 124. The pressure adjusting valve 123 is provided on the first nozzle assembly 121 and the second nozzle assembly 122 respectively. The first nozzle assembly 121 and the second nozzle assembly 122 are used for realizing spraying tasks. The pressure adjusting valve 123 is used for adjusting the nozzle pressures of the first nozzle assembly 121 and the second nozzle assembly 122, thereby adjusting the spraying width of the UAV 100. The liquid guide tube 124 is used for introducing liquid in the liquid supply tank 140 into the first nozzle assembly 121 and the second nozzle assembly 122. The number of the first nozzle assembly 121 and the second nozzle assembly is at least one, which may be one, two, three, four, or more, and the embodiments of the present application do not specifically limit this. If the material is a solid material such as fertilizer, the spraying apparatus may be a spraying apparatus for spraying out the solid material in granular form.

In one embodiment, the UAV 100 includes a control apparatus, which controls the UAV 100 in real time during the process of the UAV to perform a spraying operation on a target plot of land. The UAV may comprise a range-finding sensor for detecting a distance between the UAV and an obstacle in the environment surrounding the UAV and/or a distance between the UAV and the ground below the UAV or the crop being sprayed. The range-finding sensor may comprise a radar apparatus 150, which may be a lidar or a millimeter wave radar, which is not specifically limited by embodiments of the present application.

The UAV 100 may have one or more power systems 130, and all of the power systems 130 may be of the same type. Optionally, the one or more power systems 130 may be of different types. The power systems 130 may be mounted on the body 110 of the UAV 100 by suitable means, such as by a support structure (e.g., a drive shaft). The power systems 130 may be mounted at any suitable location of the UAV 100, such as at the top, bottom, front, rear, side, or any combination thereof.

In one embodiment, the power system 130 can enable the UAV 100 to take off vertically from the ground, or land vertically on the ground, without requiring any horizontal movement of the UAV 100 (e.g., without taxiing on a runway). Optionally, the power systems 130 can allow the UAV 100 to hover in a predetermined position and/or direction in the air. One or more of the power systems 130 may be independent of other power systems 130 when under control. Optionally, one or more of the power systems 130 may be under control at the same time. For example, the UAV 100 may have a plurality of horizontally oriented power systems 130 to provide lifting force and/or propulsion. The horizontally oriented power systems 130 may be actuated to provide the ability for the UAV 100 to take off vertically, land vertically, and/or hover.

In one embodiment, one or more of the horizontally oriented power systems 130 may rotate in a clockwise direction, while one or more of other horizontally oriented power systems may rotate in a counterclockwise direction. For example, there are the same number of power systems 130 that rotate clockwise as the number of the power systems 130 that rotate counterclockwise. The rate of rotation of each of the horizontally oriented power systems 130 may be varied independently to enable lifting and/or pushing operations resulting from each power system to adjust the spatial orientation, speed, and/or acceleration of the UAV 100 (e.g., rotation and translation with respect to up to three degrees of freedom).

In an embodiment, the UAV 100 is capable of being wirelessly communicatively connected to a control terminal, which can realize data interactions between the control terminal and the UAV 100, for example, to control flight of the UAV 100 or a load (when the load is a photographing apparatus, the control terminal can control the photographing apparatus). The control terminal can communicate with the UAV 100 and/or the load, and can provide direct communication between the UAV 100 and the control terminal. This direct communication may occur without the need for any intermediary apparatus or network.

In an embodiment, indirect communication may be provided between the UAV 100 and the control terminal. This indirect communication may occur with the aid of one or more intermediary apparatuses or networks. For example, the indirect communication may utilize a telecommunications network. The indirect communication may occur with the aid of one or more routers, communication towers, satellites, or any other intermediate apparatus or network. Examples of types of communication may include, but are not limited to, communication via: the Internet, a local area network (LAN), a wide area network (WAN), Bluetooth, near-field communication (NFC) technology, networks based on mobile data protocols such as the General Packet Radio Service (GPRS), the GSM Enhanced Data GSM Environment (EDGE), the 3G, 4G, or Long Term Evolution (LTE) protocols, infrared (IR) communication technology, and/or Wi-Fi, and may be wireless, wired, or a combination thereof.

The control terminal may include, but is not limited to: a remote controller, a smart phone/cell phone, a tablet computer, a personal digital assistant (PDA), a desktop computer, a media content player, a video gaming station/system, a virtual reality system, an augmented reality system, a wearable apparatus (e.g., a watch, eyeglasses, gloves, a headgear such as a hat, a helmet, a virtual reality headset, an augmented reality headset, head-mounted apparatus (HMD), headband, pendant, armband, leg band, shoe, vest), gesture recognition apparatus, microphone, any electronic apparatus capable of providing or rendering image data, or any other type of apparatus. The control terminal may be a handheld terminal, and the control terminal may be portable. The control terminal may be carried by a human user. In some instances, the control terminal may be remote from the human user and the user may control the terminal using wireless and/or wired communications.

Hereinafter, the control method provided by some embodiments of the present application will be described in detail in connection with the UAV in FIG. 1. It is to be noted that the UAV in FIG. 1 is only used to explain the control method provided by some embodiments of the present application, but does not constitute a limitation of the application scenarios of the operation control method provided by some embodiments of the present application.

Figure 2:
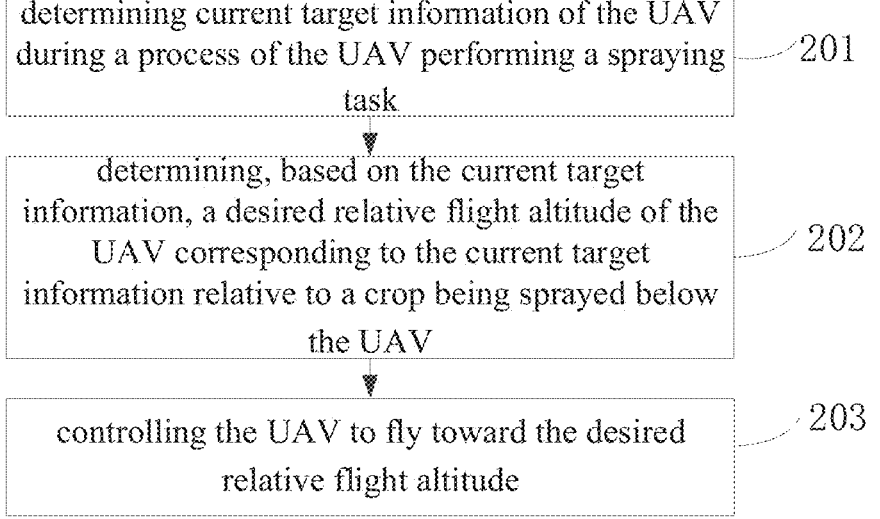
FIG. 2 shows a flow diagram of a control method provided by an embodiment of the present application.

FIG. 2 illustrates a flowchart of a method of controlling an aerial vehicle such as a UAV provided by an embodiment of the present application. The UAV includes a propeller for providing flight power and a spraying apparatus for spraying materials. The UAV in an embodiment of the present application may be a UAV as described in FIG. 1. In some embodiments, the UAV may also be a jet UAV, the UAV comprising a jet assembly for providing flight power, and the downward pressure wind field may be generated by the jet assembly. The method, as shown in FIG. 2, may comprise:

Step 201, determining current target information of the UAV during a process of an UAV performing a spraying task.

Step 202, determining, based on the current target information, a desired relative flight altitude of the UAV corresponding to the current target information relative to the crop being sprayed below it.

Step 203, controlling the UAV to fly toward the desired relative flight altitude.

In the above step 201, the spraying task may be a medicament spraying task, a water spraying task, or a fertilizer spraying task, and so on. The UAV may be configured with sensors for collecting the current target information. The sensors configured on the UAV may collect current target information of the UAV in real time during flight, wherein the current target information is used to indicate the wind field strength of the downward pressure wind field currently generated by the propeller. If the UAV is a jet UAV, the current target information is used to indicate the current strength of the downward pressure wind field generated by the jet assembly. Wherein the current target information may include at least one of a rotational speed of a propeller, a load weight of the UAV, a current of a motor driving the propeller, a voltage of a motor driving the propeller, and a duty cycle of a PWM control command of the motor.

The applicant has found through research that the wind field strength of the downward pressure wind field generated by the propeller is related to the load weight of the UAV. The greater the load weight of the UAV, the greater the rotational speed of the propeller, and accordingly the greater the wind field strength of the downward pressure wind field generated by the propeller.

In an embodiment, the target information may include one of the following items: a rotational speed of the propeller and a load weight of the UAV. The current target information includes a current load weight of the UAV or a current rotational speed of the propeller.

The load weight of the UAV may be that which is measured by a load test sensor provided on the UAV. The load weight of the UAV may be determined by measuring the capacity or amount of the spraying load in the material tank. For example, when the material is a medicinal liquid, the load weight of the UAV may be determined by measuring the capacity or amount of the medicinal liquid carried by the spraying apparatus, for example, by means of a level meter to measure the capacity or amount of the medicinal liquid carried by the spraying apparatus. In some embodiments, the load weight of the UAV may be the weight of the material carried by the spraying apparatus. In some embodiments, the load weight of the UAV may be the sum of the weight of the material carried by the spraying apparatus and the weight of the UAV. The current rotational speed of the propeller may be determined by the current rotational speed of the motor driving the rotation of the propeller, and the current rotational speed of the motor may be obtained through an electronic speed control (ESC) system on the UAV. As such, the current rotational speed of the propeller may be determined. Alternatively, the current rotational speed of the motor may be determined based on a current Pulse Width Modulation (PWM) control command of the motor or a current voltage or current of the motor. As such, the current rotational speed of the propeller may be determined.

The number of propellers on the UAV may be one or more. When it is a plurality, the rotational speed of the current propellers may be an average rotational speed or a median rotational speed of the plurality of propellers, which is not specifically limited by embodiments of the present application.

The current PWM control command of the motor and the current voltage or current of the motor are both related to the current rotational speed of the propeller, so the current PWM control command of the motor and the current voltage or current of the motor can also be used to indicate the wind field strength of the downward pressure wind field generated by the propeller. Thus, in another example, the above current target information may include the current PWM control command (Pulse Width Modulation) of the motor or the current voltage or current of the motor.

Figure 3:
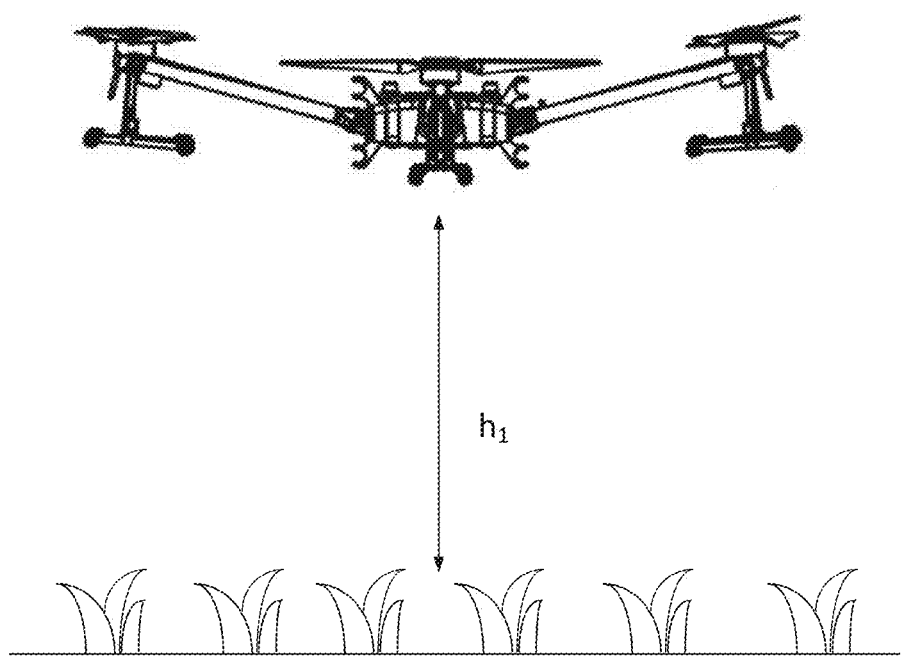
FIG. 3 shows an example diagram of a first scenario provided by an embodiment of the present application.
Figure 4:
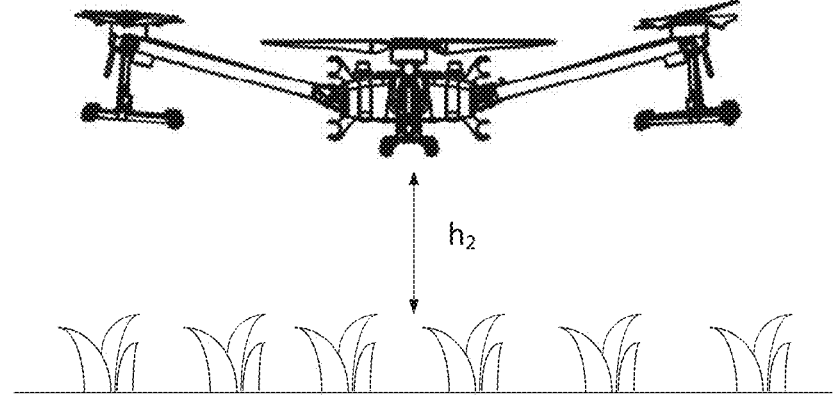
FIG. 4 shows an example diagram of a second scenario provided by an embodiment of the present application.

In the above-described step 202, in an example, as mentioned before, during the process of the UAV performing the spraying task, the strength of the downward pressure wind field generated by the propellers is varied, then the target information of the UAV is also varied during the process of the UAV performing the spraying task. In order to reduce the damage caused to the crop by the fall of the crop caused by the larger strength of the downward pressure wind field in the early stage of the spraying task and to solve the problem of poor spraying effect caused by the smaller strength of the downward pressure wind field in the later stage of the spraying task, in the course of the spraying task, a desired relative flight altitude of the UAV corresponding to the current target information relative to the crop being sprayed below it may be determined in real time based on the current target information. The desired relative flight altitude of the UAV corresponding to the current target information relative to the crop being sprayed below it is gradually decreasing during the process of the spraying task performed by the UAV. For example, as shown in FIG. 3, in the early stage of performing the spraying task, the wind field strength of the downward pressure wind field generated by the propeller indicated by the current target information is large, and the desired relative flight height h1 of the UAV corresponding to the current target information relative to the crop being sprayed below it can be determined based on the current target information. As shown in FIG. 4, at a later stage of performing the spraying task, the wind field strength of the downward pressure wind field generated by the propeller indicated by the current target information is smaller, and the desired relative flight height h2 of the UAV corresponding to the current target information relative to the crop being sprayed below it can be determined based on the current target information, wherein h1 is larger than h2, so that in the early stage of performing the spraying task, the desired relative flight height is larger, and the collapsing damage to the crop by the larger wind field strength of the downward pressure wind field can be reduced. In the later stage of the spraying task, the desired relative flight altitude is smaller, which allows the UAV to be closer to the crop, so that the smaller wind field strength of the downward pressure wind field can cause the material penetrating into the crop to ensure the spraying effect.

In determining a desired relative flight height of the UAV corresponding to the current target information relative to the crop being sprayed below it based on the current target information, the current target information and the desired relative flight height of the UAV corresponding to the current target information with respect to the crop being sprayed below it are positively correlated. When the current target information becomes larger, the determined desired relative flight height of the UAV relative to the crop being sprayed below it corresponding to the current target information becomes larger. When the current target information becomes smaller, the determined desired relative flight height of the UAV relative to the crop being sprayed below it corresponding to the current target information becomes smaller. In one embodiment, at an early stage of a spraying task, the determined current target information is larger and the desired relative flight height of the UAV relative to the crop being sprayed below it corresponding to the current target information is larger; at a later stage of a spraying task, the determined current target information is smaller and the desired relative flight height of the UAV relative to the crop being sprayed below it corresponding to the current target information is smaller.

In another example, a desired relative flight height of the UAV relative to the crop being sprayed below it may be determined based on the current target information and a predetermined correspondence between target information and a corresponding desired relative height, as will be described in the following embodiments. Wherein the correspondence may include a relationship curve between the target information and the corresponding desired relative altitude or a plurality of pairs of values relating the target information and the corresponding desired relative altitude.

In step 203, the UAV is controlled to fly toward the desired relative flight altitude. If the current actual relative flight altitude of the UAV relative to the crop is lower than the desired relative flight altitude, the UAV is controlled to ascend in order to arrive at the desired relative flight altitude; if the current actual relative flight altitude of the UAV relative to the crop is higher than the desired relative flight altitude, the UAV is controlled to descend in order to arrive at the desired relative flight altitude; if the current actual relative flight altitude of the UAV relative to the crop is equal to the desired relative flight altitude, the UAV is controlled to fly horizontally.

In the technical solution provided by some embodiments of the present application, during a spraying task performed by a UAV, current target information for indicating a wind field strength of a downward pressure wind field generated by a propeller of the UAV is determined; and based on current the target information, the desired relative flight height of the UAV relative to the crop being sprayed is adjusted. That is, the relative flight height of the UAV relative to the sprayed crop below the UAV is adjusted according to the wind field strength of the downward pressure wind field generated by the propeller of the UAV. By adopting the technical solution provided by some embodiments of this application, it is possible to reduce the collapsing damage to the crops being sprayed while ensuring the spraying effect of spraying material, thereby improving quality of the spraying operation.

In one embodiment, the above method may further comprise:

Step 204: determining a current actual relative flight altitude of the UAV relative to the crop.

In the above-described step 204, the current actual relative flight altitude of the UAV relative to the crop may be detected by a ranging sensor of the UAV as previously described. The ranging sensor may be a radar apparatus.

In one embodiment, controlling the UAV in the step 203 to fly toward the desired relative flight altitude may specifically include:

Step 2031: controlling the UAV to fly toward the desired relative flight altitude based on the desired relative flight altitude as well as the actual relative flight altitude.

In step 2031, a vertical flight control command may be determined based on a desired relative flight altitude and an actual relative flight altitude, and the UAV may be controlled to fly toward the desired flight altitude based on the vertical flight control command. Wherein the vertical flight control command may include a vertical flight speed. In one embodiment, the vertical flight speed may be determined based on a difference between the desired relative flight altitude and the actual relative flight altitude. For example, when the value of the difference is positive, the direction of the vertical flight speed faces upward; when the value of the difference is negative, the direction of the vertical flight speed faces downward; and the larger the absolute value of the difference, the larger the magnitude of the vertical flight speed.

In one embodiment, controlling the UAV in the step 203 to fly toward the desired relative flight altitude may specifically include:

Step 2032: if the absolute value of the difference between the desired relative flight altitude and the actual relative flight altitude is greater than a. preset threshold, controlling the UAV to fly toward the desired relative flight altitude.

That is to say, only when the actual relative flight altitude differs greatly from the desired relative flight altitude, will the relative flight altitude of the UAV be adjusted. Among them, the size of the predetermined threshold may be set according to the actual need, or determined according to the experimental results, and some embodiments of the present application do not make specific limitations thereon.

In one embodiment, the above method may further comprise:

Step 205: obtaining a correspondence between the target information and the corresponding desired relative flight altitude.

One or more of the following methods may be used to obtain the above correspondence:

Method 1: obtaining the correspondence from a local storage apparatus of the UAV.

wherein the local storage apparatus of the UAV pre-stores the correspondence. The local storage apparatus may be a memory within the flight control unit.

Method 2: obtaining the correspondence from a control terminal to which the UAV is communicatively connected.

The correspondence may be preexisting in the control terminal or obtained by the control terminal from a server. In the described scenario, the correspondence may be pre-existing in a local storage apparatus of the control terminal, and the control terminal may send the correspondence to the UAV. In the scenario where the control terminal obtains the correspondence from the server, the UAV may send a request for obtaining the correspondence to the control terminal; the control terminal, after receiving the request for obtaining the correspondence, forwards the request for obtaining the correspondence to the server, and then receives the correspondence returned by the server and forwards the correspondence to the UAV.

In order to enable the technical solutions provided by some embodiments of the present application to be adapted to different types of crops, different correspondences between the target information and the corresponding desired relative flight altitude may be configured for different types of crops. In one embodiment, the method may further comprise:

Step 207: determining the type of crop in question.

The type of crop may be determined in one or more of the following ways:

Method I: obtaining type indicative information about the type of the crop from a control terminal to which the UAV is communicatively connected, and determining the type of the crop based on the type indicative information.

The type indicative information may be generated by the control terminal in response to a crop type indication operation by a user. By way of example: a crop type selection interface may be displayed on a display of the control terminal, on which a plurality of selectable crop types may be provided. In response to a selection operation triggered by the user on the interface, type indicative information is generated. The selection operation is also a crop type indication operation.

Mode II, obtaining an image taken by the UAV of the crop; and performing image recognition on the image to determine the type of the crop.

The UAV may be provided with a camera through which an image of the crop below it is captured, and a recognition algorithm may be run against the image to determine the type of crop captured by the camera, for example, by feeding the image into a trained neural network model to obtain the type of crop output by the neural network model.

In some embodiments, the determining a desired relative flight altitude of the UAV relative to a crop being sprayed below it corresponding to the current target information based on the current target information and controlling the UAV to fly toward the desired relative flight altitude comprises: if the determined type of crop is a predetermined type of crop, determining a desired relative flight altitude of the UAV corresponding to the current target information based on the current target information, and controlling the UAV to fly toward the desired relative flight altitude based on the current target information. The predetermined type of the crop may be a type of crop that is prone to fall over, such as a soft pole crop type, specifically rice or paddy, etc. In some embodiments, the predetermined type of the crop may be determined by a user. In response to determining that the current type of operation to be sprayed is a predetermined crop type, a desired relative flight altitude corresponding to the current target information may be determined in real time based on the current target information, and the UAV may be controlled to fly at the desired relative flight altitude.

In some embodiments, in response to determining that the type of the crop is a predetermined crop type, a prompt message may be sent to the control terminal to cause the control terminal to display a prompt notification, the prompt notification may be used to instruct a user to perform a selection operation, wherein the selection operation is used to determine whether or not to determine, on the basis of the current target information, a desired relative flight altitude of the UAV corresponding to the current target information relative to the crop being sprayed below it, and to control the UAV to fly toward the desired relative flight altitude. In one embodiment, the method further comprises: obtaining selection information sent by a control terminal, wherein the selection information is generated by the control terminal detecting a selection operation of a user. The selection information is a consent indication information or a rejection indication information. If the selection information is a consent indication information, determining that the user permits determining a desired relative flight altitude of the UAV corresponding to the current target information relative to the crop being sprayed below it based on the current target information, and controlling the UAV to fly toward the desired relative flight altitude. If the selection information is a rejection indication information, determining that the user refuses to determine a desired relative flight altitude of the UAV relative to the crop being sprayed below it corresponding to the current target information based on the current target information, and controlling the UAV to fly toward the desired relative flight altitude. Further, the determining the desired relative flight altitude of the UAV corresponding to the current target information relative to the crop being sprayed below it based on the current target information and controlling the UAV to fly toward the desired relative flight altitude may comprise: if the type of the determined crop is a predetermined crop type and the selection information is the consent indication information, determining a desired relative flight altitude of the UAV corresponding to the current target information relative to the crop being sprayed below it based on the current target information, and controlling the UAV to fly toward the desired relative flight altitude.

In one embodiment, obtaining the correspondence between the target information and the corresponding desired relative flight altitude in the above 206, specifically includes:

Step 2061: obtaining a correspondence between target information and a corresponding desired relative flight altitude in correspondence with the type of crop.

In one embodiment, the above step 202 of determining, based on the current target information, a desired relative flight altitude of the UAV corresponding to the current target information relative to the crop being sprayed below it specifically comprises:

Step 2021: determining, based on the current target information and the correspondence, a desired relative flight altitude of the UAV corresponding to the current target information relative to the crop being sprayed below it.

A desired relative flight altitude corresponding to the current target information is extracted from the correspondence to be the desired relative flight altitude of the UAV relative to the crop being sprayed below it.

In some embodiments, the correspondence is calibrated by determining the spraying effect and collapsing damage to crop by the downward pressure wind field of UAVs of different load weights at different flight altitudes relative to the crop. Specifically, the UAVs of different load weights can be controlled to fly to a plurality of different flight altitudes relative to the crop for each of the plurality of different UAVs, to determine the effect of the strength of the downward pressure wind field on the crop's collapsing and to determine the spraying effect of the material, which can be detected with test paper if the material is a liquid. Further, the flight altitude relative to the crop at which the spraying effect is best among a plurality of different flight altitudes and the damage to the crop's collapse is minimized is determined as the desired relative flight altitude, and a correspondence between the target information of the UAV and the corresponding desired relative flight altitude is established at that load weight. By means of this correspondence, the desired relative flight altitude corresponding to the current target information can be determined.

In one embodiment, the correspondence comprises a first correspondence between a rotational speed of the propeller and a corresponding desired relative flight altitude; the current target information comprising the current rotational speed of the propeller.

In step 2021, the determining, based on the current target information and the correspondence, a desired relative flight altitude of the UAV corresponding to the current target information relative to the crop being sprayed below it may comprise: determining, based on the current rotational speed of the propeller and the first correspondence, a desired relative flight altitude of the UAV corresponding to the current rotational speed of the propeller relative to the crop being sprayed below it.

In another embodiment, the correspondence comprises a second correspondence between a load weight of the UAV and a corresponding desired relative flight altitude; the current target information comprising the current load weight of the UAV;

In step 2021, the determining, based on the current target information and the correspondence, a desired relative flight altitude of the UAV corresponding to the current target information relative to the crop being sprayed below it may comprise: determining, based on a current load weight of the UAV and the second correspondence, a desired relative flight altitude of the UAV corresponding to the current load weight of the UAV relative to the crop being sprayed below it.

In another embodiment, the correspondence may comprise: a third correspondence between a wind field strength and a corresponding desired relative flight altitude; the current target information comprising a wind field strength of a downward pressure wind field currently generated by the propeller. In step 2021, the determining, based on the current target information and the correspondence, a desired relative flight altitude of the UAV corresponding to the current target information relative to a crop being sprayed below it may comprise: determining, based on a wind field strength of a downward pressure wind field currently generated by the propeller and the third correspondence, a desired relative flight altitude of the UAV relative to the crop being sprayed below it.

From the above analysis, it can be seen that the wind field strength is related to the rotational speed of the propeller or the load weight of the UAV, and furthermore, the load weight of the UAV is positively correlated with the rotational speed of the propeller, so that the rotational speed of the propeller is relatively high when the load weight of the UAV is large, and the rotational speed of the propeller is relatively low when the load weight of the UAV is small. Then, the wind field strength of the downward pressure wind field currently generated by the propeller may be calculated based on the current rotational speed of the propeller or the current load weight of the UAV. The specific calculation formula may also be determined based on experimental results, and the embodiments of the present application do not specifically limit this.

In order to meet the user's requirement for flexibility in use, the UAV may be configured in advance with two operating modes, and the user may select the desired operating mode by means of a preset button on the UAV, a user interaction apparatus on a control terminal communicatively connected to the UAV, such as a preset button or a control on a display of the control terminal. The first operating mode may be understood as an automatic heightening mode; the second operating mode may be understood as a manual heightening mode. In one embodiment, the method further comprises:

Step 207: obtaining the operating mode indication information.

If the operating mode indication information indicates that the operating mode of the UAV is a first operating mode, then steps 202 and 203 above are performed.

wherein the desired relative flight altitude is automatically determined according to the manner as previously described.

In addition, the method may also comprise:

Step 208, controlling the UAV to fly toward a target relative flight altitude if the operating mode indication information indicates that the operating mode of the UAV is a second operating mode.

wherein the target relative flight altitude is indicated by the user, i.e. manually set by the user.

In this way, in the process of actual use, the user can choose the corresponding operating mode according to the actual situation. For example, if the user has rich spraying experience and can more accurately determine the appropriate relative flight altitude of the UAV in different situations, the second operating mode can be selected; otherwise, the first operating mode can be selected.

Figure 5:
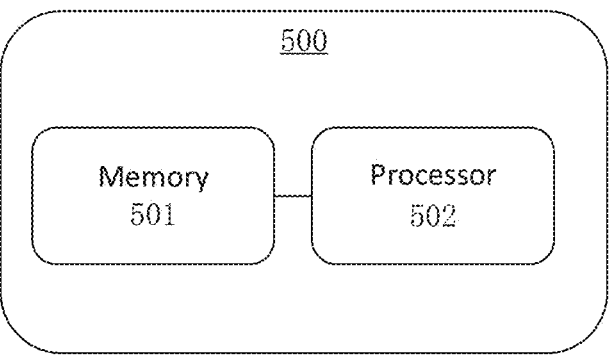
FIG. 5 shows a structural block diagram of a control apparatus provided by an embodiment of the present application.

FIG. 5 illustrates a structural block diagram of a control apparatus for a UAV provided in an embodiment of the present application. The UAV comprises a propeller for providing flight power and a spraying apparatus for spraying materials. The control apparatus 500, as shown in FIG. 5, comprises: a memory 501 and a processor 502, wherein:

the memory 501 for storing program code;

the processor 502 for invoking and executing the program code, and when the program code is executed, for performing the following steps:

determining current target information of the UAV during a process of the UAV performing the spraying task, wherein the current target information is used to indicate the current wind field strength of a downward pressure wind field generated by the propeller;

determining, based on the current target information, a desired relative flight altitude of the UAV corresponding to the current target information relative to the crop being sprayed below it; and controlling the UAV to fly toward the desired relative flight altitude.

Optionally, the processor 502 is configured for:

determining a current actual relative flight altitude of the UAV relative to the crop; and controlling the UAV to fly toward the desired relative flight altitude based on the desired relative flight altitude as well as the actual relative flight altitude.

Optionally, the processor 502 is configured for:

determining a current actual relative flight altitude of the UAV relative to the crop; and If the absolute value of the difference between the desired relative flight altitude and the actual relative flight altitude is greater than a predetermined threshold, controlling the UAV to fly toward the desired relative flight altitude.

Optionally, the target information comprises at least one of the following items: a rotational speed of the propeller or a load weight of the UAV.

Optionally, the processor 502 is configured for:

obtain a correspondence between the target information and the corresponding desired relative flight altitude;

determining, based on the current target information and the correspondence, a desired relative flight altitude of the UAV corresponding to the current target information relative to the crop being sprayed below it.

Optionally, the target information comprises a rotational speed of the propeller, the correspondence comprising a first correspondence between the rotational speed of the propeller and a corresponding desired relative flight altitude.

The processor 502 is configured for:

determining a desired relative flight altitude of the UAV corresponding to the current rotational speed of the propeller relative to the crop being sprayed below it, based on the current rotational speed of the propeller and the first correspondence.

Optionally, the target information comprises a load weight of the UAV, and the correspondence comprises a second correspondence between the load weight of the UAV and a corresponding desired relative flight altitude.

The processor 502 is configured for:

determining a desired relative flight altitude of the UAV corresponding to the current load weight of the UAV relative to the crop being sprayed below it based on the current load weight of the UAV and the second correspondence.

Optionally, the processor 502 is configured for:

obtaining the correspondence from a local storage apparatus of the UAV, wherein the local storage apparatus of the UAV pre-stores the correspondence; or obtaining the correspondence from a control terminal to which the UAV is communicatively connected, wherein the correspondence is preexisting in the control terminal or is obtained by the control terminal from a server.

Optionally, the processor 502 is configured for:

determining the type of crop being sprayed; and obtaining target information corresponding to the type of the crop in correspondence with a desired relative flight altitude.

Optionally, the processor 502 is configured for:

obtaining from a control terminal to which the UAV is communicatively connected type indicative information regarding the type of the crop, determining the type of the crop based on the type indicative information; or obtaining an image taken by the UAV of the crop, and performing image recognition on the image to determine the type of the crop.

Optionally, the processor 502 is configured for:

obtaining the operating mode indication information;

If the operating mode indication information indicates that the operating mode of the UAV is a first operating mode, determining a desired relative flight altitude of the UAV corresponding to the current target information relative to the crop being sprayed below it based on the current target information, and controlling the UAV to fly toward the desired relative flight altitude.

Optionally, the processor 502 is configured for:

controlling the UAV to fly toward a target relative flight altitude if the operating mode indication information indicates that the operating mode of the UAV is a second operating mode, wherein the target relative flight altitude is indicated by a user.

Optionally, the desired relative flight altitude is positively correlated with the target information.

Optionally, during the course of the spraying task, the determined desired relative flight altitude gradually decreases.

Figure 6:
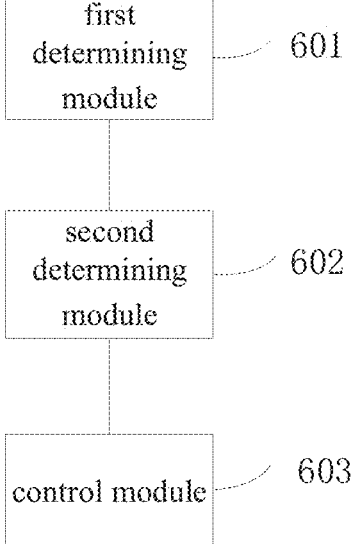
FIG. 6 shows a structural block diagram of a control apparatus provided by an embodiment of the present application.

FIG. 6 illustrates a block diagram of the structure of a control apparatus of a UAV provided in yet another embodiment of the present application. The UAV comprises a propeller for providing flight power and a spraying apparatus for spraying material. The apparatus, as shown in FIG. 2, may comprise:

a first determining module or circuitry 601 for determining current target information of the UAV during a process of the UAV performing a spraying task, wherein the current target information is used to indicate the wind field strength of a downward pressure wind field currently generated by the propeller;

a second determining module or circuitry 602 for determining, based on the current target information, a desired relative flight altitude of the UAV corresponding to the current target information relative to the crop being sprayed below it; and a control module or circuitry 603 for controlling the UAV to fly towards the desired relative flight altitude.

Optionally, it also includes:

a third determining module or circuitry for determining a current actual relative flight altitude of the UAV relative to the crop;

The control module 603 may be configured for:

controlling the UAV to fly toward the desired relative flight altitude based on the desired relative flight altitude as well as the actual relative flight altitude.

Optionally, it also includes:

a third determining module or circuitry for determining a current actual relative flight altitude of the UAV relative to the crop;

The control module 603 may be configured for:

if the absolute value of the difference between the desired relative flight altitude and the actual relative flight altitude is greater than a preset threshold, controlling the UAV to fly toward the desired relative flight altitude. Optionally, the current target information comprises at least one of the following items: a rotational speed of a propeller or a load weight of the UAV.

Optionally, it also includes:

a first acquisition module or circuitry for obtaining a correspondence between the target information and a corresponding desired relative flight altitude;

A second determining module may be configured for:

determining, based on the current target information and the correspondence, a desired relative flight altitude of the UAV corresponding to the current target information relative to the crop being sprayed below it.

Optionally, the target information comprises a rotational speed of the propeller, and the correspondence comprises a first correspondence between the rotational speed of the propeller and a corresponding desired relative flight altitude.

A second determining module may be configured for:

determining a desired relative flight altitude of the UAV corresponding to the current rotational speed of the propeller relative to the crop being sprayed below it, based on the current rotational speed of the propeller and the first correspondence.

Optionally, the correspondence comprises a second correspondence between the load weight of the UAV and a corresponding desired relative flight altitude; the target information comprising the load weight of the UAV.

A second determining module may be configured for:

determining a desired relative flight altitude of the UAV corresponding to the load weight of the current UAV with respect to the crop being sprayed below it, based on the current load weight of the current UAV and the second correspondence.

Optionally, the first acquisition module is configured for:

obtaining the correspondence from a local storage apparatus of the UAV, wherein the local storage apparatus of the UAV pre-stores the correspondence; or obtaining the correspondence from a control terminal to which the UAV is communicatively connected, wherein the correspondence is preexisting in the control terminal or is obtained by the control terminal from a server.

Optionally, it also includes:

a fourth determining module or circuitry for determining the type of the crop;

The first acquisition module may be configured for:

obtaining target information corresponding to a type of the crop in correspondence with a desired relative flight altitude.

Optionally, the fourth determination module is configured for:

obtaining from a control terminal to which the UAV is communicatively connected type indicative information regarding the type of the crop, determining the type of the crop based on the type indicative information; or obtaining an image taken by the UAV of the crop; and performing image recognition on the image to determine the type of the crop.

Optionally, it also includes:

a second acquisition module or circuitry for acquiring operating mode indication information.

A second determining module 602 is configured for determining a desired relative flight altitude of the UAV corresponding to the current target information relative to the crop being sprayed below it, based on the current target information, if the operating mode indication information indicates that the operating mode of the UAV is a first operating mode.

The control module 603 may be configured for controlling the UAV to fly toward the desired relative flight altitude if the operating mode indicating information indicates that the operating mode of the UAV is the first operating mode.

Optionally, the control module 603 is further configured to:

controlling the UAV to fly toward a target relative flight altitude if the operating mode indication information indicates that the operating mode of the UAV is a second operating mode, wherein the target relative flight altitude is indicated by a user.

Optionally, the desired relative flight altitude is positively correlated with the target information.

Optionally, during the course of the spraying task, the determined desired relative flight altitude gradually decreases.

It should be noted herein that: the control apparatus provided by the above embodiments can realize the technical solutions described in the above method embodiments, and the principles of the specific realization of the above modules or units can be found in the corresponding contents of the above method embodiments, and will not be repeated herein.

Another embodiment of the present application provides an unmanned aerial vehicle comprising a propeller for providing flight power, a spraying apparatus or sprayer for spraying materials, and a control apparatus or controller as described in the above embodiments. Among them, the realization of the control apparatus can be found in the corresponding contents of the above embodiments and will not be repeated herein.

The technical solutions and technical features in each of the above embodiments can be used individually or in combination in case of conflict with the present application, and as long as they are not beyond the cognitive scope of the persons skilled in the art, they are all equivalent embodiments within the scope of protection of the present application.

In some embodiments provided in the present application, it should be understood that the relevant detection apparatuses (e.g., IMUs) and methods disclosed, can be realized in other ways. For example, the remote control apparatus embodiments described above are merely schematic, e.g., the division of the described modules or units is merely a logical functional division, and the actual implementation may be divided in other ways, e.g., multiple units or components may be combined or may be integrated into another system, or some features may be ignored, or not implemented. Another point is that the mutual coupling or direct coupling or communication connection shown or discussed can be an indirect coupling or communication connection through some interface, remote control apparatus or unit, which can be in electrical, mechanical or other form.

The units illustrated as separated components may or may not be physically separated, and components displayed as units may or may not be physical units, i.e., they may be located in a single place, or they may be distributed to a plurality of network units. Some or all of these units may be selected to fulfill the purpose of this embodiment scheme according to actual needs.

In addition, each functional unit in various embodiments of the present application may be integrated in a processing unit, or each unit may physically exist separately, or two or more units may be integrated in a single unit. The above integrated units may be realized either in the form of hardware or in the form of software functional units.

The integrated unit may be stored in a computer-readable storage medium if it is realized in the form of a software functional unit and sold or used as a stand-alone product. Based on this understanding, the technical solution of the present application may be embodied essentially or in part as a contribution to the prior art or in whole or in part in the form of a software product, which is a computer software product stored in a storage medium comprising a number of instructions to cause a computer processor to perform all or part of the steps of the method described in the various embodiments of the present application. The computer software product is stored in a storage medium comprising a number of instructions to cause the computer processor to perform all or some of the steps of the method described in various embodiments of the present application. The aforementioned storage media include: USB flash drives, portable hard disks, read-only memory (ROM), random access memory (RAM), disks or CD-ROMs, and other media that can store program code.

Some embodiments of the present application also provide a non-transitory computer-readable storage medium, the computer-readable storage medium storing a computer program, the computer program comprising program instructions, the processor executing the program instructions to realize the steps of the method of controlling an UAV described in any one of the above embodiments provided.

The computer-readable storage medium may be an internal storage unit of the photographing device as described in any of the preceding embodiments, such as the memory or RAM of the photographing device. The computer-readable storage medium may also be an external storage device of the photographing device, such as a plug-in hard disk equipped on the photographing device, a Smart Media Card (SMC), a Secure Digital (SD) card, a Flash Card, and the like.

The foregoing is only a specific embodiment of the present application, but the scope of protection of the present application is not limited thereto, and any person skilled in the art can easily think of various equivalent modifications or substitutions within the scope of the technology disclosed in the present application, which shall be covered by the scope of protection of the present application. Therefore, the scope of protection of this application shall be subject to the scope of protection of the claims.

What is claimed is:

1. A control method of an aerial vehicle, the aerial vehicle comprising a propulsion structure for providing flight power, the control method comprising:

determining current target information of the aerial vehicle during a process of the aerial vehicle performing a task on a material below the aerial vehicle, wherein the current target information indicates wind field strength of a downward pressure wind field generated by the propulsion structure;

obtaining a correspondence between target information and corresponding desired relative flight altitudes;

determining, based on the current target information and the correspondence, a desired relative flight altitude of the aerial vehicle corresponding to the current target information relative to the material below the aerial vehicle; and controlling the aerial vehicle to fly toward the desired relative flight altitude.

2. The control method according to claim 1, further comprising:

determining a current actual relative flight altitude of the aerial vehicle relative to the material;

wherein the controlling the aerial vehicle to fly toward the desired relative flight altitude comprises:

controlling the aerial vehicle to fly toward the desired relative flight altitude based on the desired relative flight altitude and the current actual relative flight altitude.

3. The control method according to claim 1, further comprising:

determining a current actual relative flight altitude of the aerial vehicle relative to the material;

wherein the controlling the aerial vehicle to fly toward the desired relative flight altitude comprises:

under a condition that an absolute value of a difference between the desired relative flight altitude and the current actual relative flight altitude is greater than a predetermined threshold, controlling the aerial vehicle to fly toward the desired relative flight altitude.

4. The control method according to claim 1, wherein the propulsion structure includes a propeller and a power device, and the current target information comprises one of a rotational speed of the propeller, a load weight of the aerial vehicle, a current of the power device driving the propeller, a voltage of the power device driving the propeller, or a control command of the power device.

5. The control method according to claim 1, wherein the propulsion structure is a propeller, the target information comprises a rotational speed of the propeller, and the correspondence comprises a first correspondence between the rotational speed of the propeller and the corresponding desired relative flight altitude;

wherein the determining, based on the current target information and the correspondence, the desired relative flight altitude of the aerial vehicle corresponding to the current target information relative to the material below the aerial vehicle comprises:

determining the desired relative flight altitude of the aerial vehicle corresponding to a current rotational speed of the propeller relative to the material below the aerial vehicle based on the current rotational speed of the propeller and the first correspondence.

6. The control method according to claim 1, wherein the target information comprises a load weight of the aerial vehicle, the correspondence comprising a second correspondence between the load weight of the aerial vehicle and the corresponding desired relative flight altitude;

wherein the determining, based on the current target information and the correspondence, the desired relative flight altitude of the aerial vehicle corresponding to the current target information relative to the material below the aerial vehicle comprises:

determining the desired relative flight altitude of the aerial vehicle corresponding to a current load weight of the aerial vehicle relative to the material below the aerial vehicle based on the current load weight of the aerial vehicle and the second correspondence.

7. The control method according to claim 1, wherein the obtaining the correspondence between the target information and the corresponding desired relative flight altitude comprises:

obtaining the correspondence from a local storage apparatus of the aerial vehicle wherein the local storage apparatus of the aerial vehicle pre-stores the correspondence; or obtaining the correspondence from a control terminal to which the aerial vehicle is communicatively connected, wherein the correspondence is preexisting in the control terminal or is obtained by the control terminal from a server.

8. The control method according to claim 1, further comprising:

determining a type of the material;

wherein the obtaining the correspondence between the target information and the corresponding desired relative flight altitude comprises:

obtaining a correspondence between the target information and the corresponding desired relative flight altitude in correspondence with the type of the material.

9. The control method according to claim 8, wherein the determining the type of the material comprises:

obtaining, from a control terminal to which the aerial vehicle is communicatively connected, type indicative information regarding the type of the material, and determining the type of the material based on the type indicative information; or obtaining an image of the material taken by the aerial vehicle and performing image recognition on the image to determine the type of the material.

10. The control method according to claim 1, further comprising:

obtaining operating mode indication information;

wherein the determining, based on the current target information, the desired relative flight altitude of the aerial vehicle corresponding to the current target information relative to the material below the aerial vehicle and controlling the aerial vehicle to fly toward the desired relative flight altitude comprises:

under a condition that the operating mode indicative information indicates that the operating mode of the aerial vehicle is a first operating mode, determining the desired relative flight altitude of the aerial vehicle corresponding to the current target information relative to the material below the aerial vehicle based on the current target information and controlling the aerial vehicle to fly toward the desired relative flight altitude.

11. The control method according to claim 10, further comprising:

controlling the aerial vehicle to fly toward a target relative flight altitude under a condition that the operating mode indication information indicates that the operating mode of the aerial vehicle is a second operating mode, wherein the target relative flight altitude is indicated by a user.

12. The control method according to claim 1, wherein the desired relative flight altitude is positively correlated with the current target information.

13. The control method according to claim 1, wherein the task is a spraying task.

14. The control method according to claim 13, wherein the determined desired relative flight altitude decreases from an early stage of the process of the aerial vehicle performing the spraying task to a later stage of the process of the aerial vehicle performing the spraying task.

15. The control method according to claim 13, wherein the wind field strength of the downward pressure wind field generated by the propulsion structure decreases from an early stage of the process of the aerial vehicle performing the spraying task to a later stage of the process of the aerial vehicle performing the spraying task.

16. The control method according to claim 13, further comprising:

adjusting spraying pressure based on the wind field strength of the downward pressure wind field or the desired relative flight altitude of the aerial vehicle.

17. A control apparatus for an aerial vehicle, the aerial vehicle comprising a propulsion structure for providing flight power, the control apparatus comprising: a memory and a processor, wherein, the memory stores a program code;

the processor is configured to invoke and execute the program code and perform following steps when the program code is executed:

determining current target information of the aerial vehicle during a process of the aerial vehicle performing a task on a material below the aerial vehicle, wherein the current target information indicates wind field strength of a downward pressure wind field generated by the propulsion structure;

obtaining a correspondence between target information and corresponding desired relative flight altitudes;

determining, based on the current target information and the correspondence, a desired relative flight altitude of the aerial vehicle corresponding to the current target information relative to the material below the aerial vehicle; and controlling the aerial vehicle to fly toward the desired relative flight altitude.

18. The control apparatus according to claim 17, further comprising: wherein the propulsion structure includes a propeller and a power device, and the current target information comprises one of a rotational speed of the propeller, a load weight of the aerial vehicle, a current of the power device driving the propeller, a voltage of the power device driving the propeller, or a control command of the power device.

19. The control apparatus according to claim 17, wherein the processor is further configured to perform, under a condition that the task is a spraying task, adjusting spraying pressure based on the wind field strength of the downward pressure wind field or the desired relative flight altitude of the aerial vehicle.

* * * * *